(12) United States Patent
Hessbrüggen

(10) Patent No.: US 8,282,322 B2
(45) Date of Patent: Oct. 9, 2012

(54) MACHINING A RACE GEAR OF A CONSTANT-VELOCITY JOINT

(75) Inventor: Norbert Hessbrüggen, Salach (DE)

(73) Assignee: Emag Holding GmbH, Salach (DE)

( * ) Notice: Subject to any disclaimer, the term of this patent is extended or adjusted under 35 U.S.C. 154(b) by 1105 days.

(21) Appl. No.: 12/183,292

(22) Filed: Jul. 31, 2008

(65) Prior Publication Data

US 2009/0041555 A1 Feb. 12, 2009

(30) Foreign Application Priority Data

Aug. 7, 2007 (DE) .......................... 10 2007 037 164

(51) Int. Cl.
*B23F 5/20* (2006.01)

(52) U.S. Cl. ............... 409/26; 409/38; 409/40; 409/51; 409/55; 451/52

(58) Field of Classification Search ............... 409/26, 409/38, 40, 12, 31, 51, 55, 62; 451/5, 51, 451/52; *B23F 1/06, 5/20*
See application file for complete search history.

(56) References Cited

U.S. PATENT DOCUMENTS

| | | | | |
|---|---|---|---|---|
| 1,665,280 A | | 4/1927 | Rzeppa | ........................ 464/145 |
| 6,033,287 A | * | 3/2000 | Wiener et al. | ..................... 451/5 |
| 6,757,949 B2 | * | 7/2004 | Fitzgerald et al. | ............. 29/56.5 |
| 2006/0236542 A1 | * | 10/2006 | Walz et al. | .................. 29/893.35 |
| 2007/0186398 A1 | * | 8/2007 | Lee et al. | ........................ 29/56.5 |

FOREIGN PATENT DOCUMENTS

| | | | |
|---|---|---|---|
| DE | 10211129 A1 | * | 10/2003 |
| EP | 0921329 | | 12/1997 |
| WO | WO-2006058556 | | 6/2006 |

* cited by examiner

*Primary Examiner* — Daniel Howell
*Assistant Examiner* — Justin Sikorski
(74) *Attorney, Agent, or Firm* — Andrew Wilford

(57) ABSTRACT

Race grooves and lobe outer surfaces of a constant-velocity race gear centered on a gear axis are finished by engaging a first groove of the race gear with a rotating groove-machining tool and relatively moving the race gear and rotating groove-machining tool arcuately to finish the first groove while holding the race gear against rotation about its gear axis. Then the first groove of the race gear is disengaged from the rotating groove-machining tool while holding the race gear against rotation about its gear axis. Then the race gear is rotated about its gear axis to align a second groove with the rotating groove-machining tool while engaging a first lobe outer surface with a rotating surface-machining tool to finish same. These steps are repeated in the same order to finish the second groove and a second lobe outer surface and so on until all the grooves and lobe outer surfaces of the race gear are finished.

13 Claims, 4 Drawing Sheets

MACHINING A RACE GEAR OF A CONSTANT-VELOCITY JOINT

FIELD OF THE INVENTION

The present invention relates to a hub or race gear of a constant velocity joint. More particularly this invention concerns a method of and apparatus for matching such a gear.

BACKGROUND OF THE INVENTION

A typical race gear or inner race of a constant-velocity joint fits inside a ball cage that in turn fits inside the cup-shaped outer race of the gear, with an array of coupling balls each seated in a respective outwardly open groove of the race gear and an inwardly open groove of the outer race and passing through a respective window of the cage. Such joints typically have six balls and are commonly used, for instance, to transmit torque from the engine to the front wheels of a front-drive vehicle. See U.S. Pat. No. 1,665,280.

The race gear, which acts as an inner race, is a body formed with a central normally throughgoing splined bore for connection to a shaft. Externally it has a plurality of lobes each having a radially outwardly directed outer surface that is formed as a surface section of an imaginary sphere centered on a point lying on the axis of the bore, so that it is bicurved. Between the lobes the race gear is formed with radially outwardly open generally semicircular-section race grooves whose floors are outwardly convex and centered on the same point. The outer race has the complementary radially inwardly open race grooves to hold the balls that couple the races together.

Obviously the quality of the constant-velocity joint depends largely on the accuracy with which the parts are made. Furthermore constant-velocity joints are produced in large quantities with, for instance, as many as ten being used in a four-wheel drive vehicle. They must be very reliable, have a long service life, and manufactured at the lowest possible cost.

The starting part for the race gear is cast piece of high-quality steel whose shape generally corresponds to the desired finished shape. It is normally first bored out and internally splined to form its central hole, and to allow it to be accurately positioned for subsequent machining and finishing of its race grooves and outer surfaces.

In the manufacturing method known in practice the grooves of the race gears are produced by broaching, milling, or grinding. The lobe outer surface, however, is often finished in a rotating manner. It is known from EP 0 921 329 B1 to produce both the lobe outer surface and the race grooves by means of rotating in one setting. In this method the race grooves extending axially are successively finished groove by groove, the workpiece being angularly stepped for changing from one race groove to the next. As a final step the lobe outer surface is finished.

It is further known from WO2006/058556 A1 to simultaneously process the race grooves and/or parts of the lobe outer surface of race gears using rotating tools. The rotational axes of the tools can be offset radially relative to the workpiece, and are preferably on a plane orthogonal to the workpiece axis. In order to be able to process different workpiece shapes, the angle between the tool axes can also be changed. Furthermore, the workpiece is movably held along its longitudinal axis, and can be set into rotation. Overall, five movement axes are required.

OBJECTS OF THE INVENTION

It is therefore an object of the present invention to provide an improved system for making a constant-velocity race gear.

Another object is the provision of such an improved system for making a constant-velocity race gear that overcomes the above-given disadvantages, in particular that enables a simple and cost-effective production.

SUMMARY OF THE INVENTION

Race grooves and lobe outer surfaces of a constant-velocity race gear centered on a gear axis are finished according to the invention by engaging a first groove of the race gear with a rotating groove-machining tool and relatively moving the race gear and rotating groove-machining tool arcuately to finish the first groove while holding the race gear against rotation about its gear axis. Then the first groove of the race gear is disengaged from the rotating groove-machining tool while holding the race gear against rotation about its gear axis. Then the race gear is rotated about its gear axis to align a second groove with the rotating groove-machining tool while engaging a first lobe outer surface with a rotating surface-machining tool to finish same. These steps are repeated in the same order to finish the second groove and a second lobe outer surface and so on until all the grooves and lobe outer surfaces of the race gear are finished.

One advantageous aspect of the invention is to process the lobe outer surface of race gears during currently unutilized non-productive times. In the device according to the invention the workpiece holder is attached on the machine frame for displacement along two relatively orthogonal axes. To this end, the workpiece holder and the finishing tools are arranged such that a lobe outer surface segment located between two race grooves can be completely finished during rotation of the race gear for changing from one race groove to the next. The device gets by with only three driven axes, and is less complicated as opposed to prior-art machines. Simultaneously, the finishing time can be drastically reduced. When changing from one race groove to the next the race gear is initially displaced from the effective range of the groove-machining tool, and subsequently pivoted. According to the invention the finishing of the lobe outer surface takes place during the time for these two movements. The movement of the race gear from engagement with the groove-machining tool can simultaneously serve as a delivery movement toward the tool for the finishing of the lobe outer surfaces, and the pivoting movement acts as a feed movement for this latter tool. Together with tools for grinding and/or milling this method enables both fine and rough finishing.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
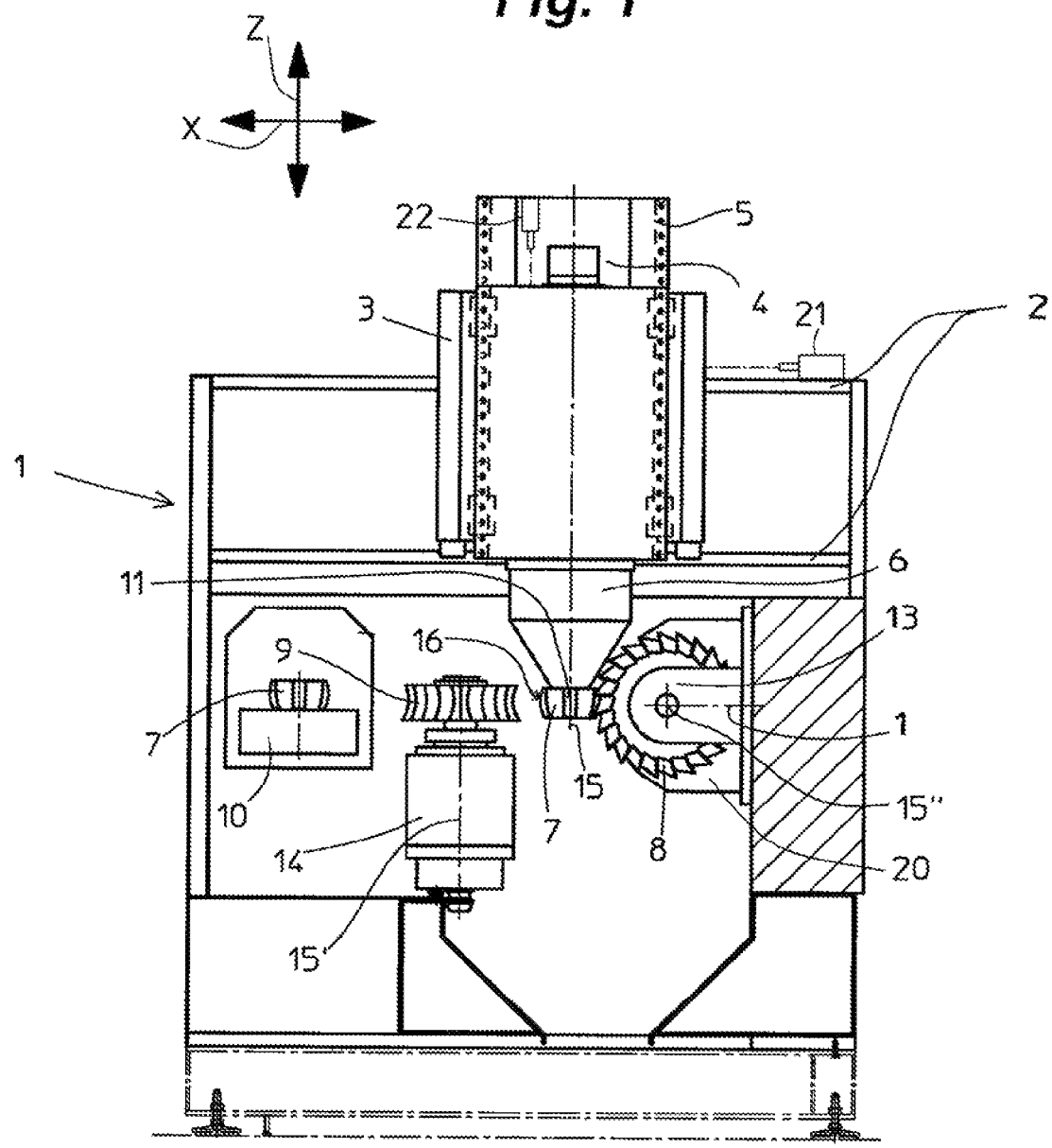
FIG. 1 is a front view of a machine for manufacturing a constant-velocity race gear according to the invention.

As seen in FIG. 1 race gears 7 are finished in a machine having a frame 1 with two parallel guide rails 2 extending in a normally horizontal direction x and supporting an x-carriage 3 for movement by an actuator shown schematically at 21 in this direction x. A z-carriage 4 can be moved by an actuator shown schematically at 22 in a normally vertical direction z on the x-carriage 3 on vertical guides 5 thereon. The z-carriage 4 in turn carries a pick-up spindle 6 rotatable about a vertical axis 15 parallel to the direction z and provided at its lower end with a fitting for engagement in a center hole of a gear-hub workpiece 7 to be machined. The carriages 3 and 4 can pick up unfinished workpieces 9 from a station 10 and, once they are machined, move back to the station so they can be transported away.

The gear hubs 7 each have a plurality of race grooves 11 separated by an angle α here of 60°. The grooves 11 define lobes 17 having radially outwardly directed surfaces 16 that all lie on a common spherical surface centered on a point on the center axis of the gear 7, which when the gear 7 is being machined is coaxial with the spindle axis 15 and not separately identified here to avoid confusion.

Figure 2:
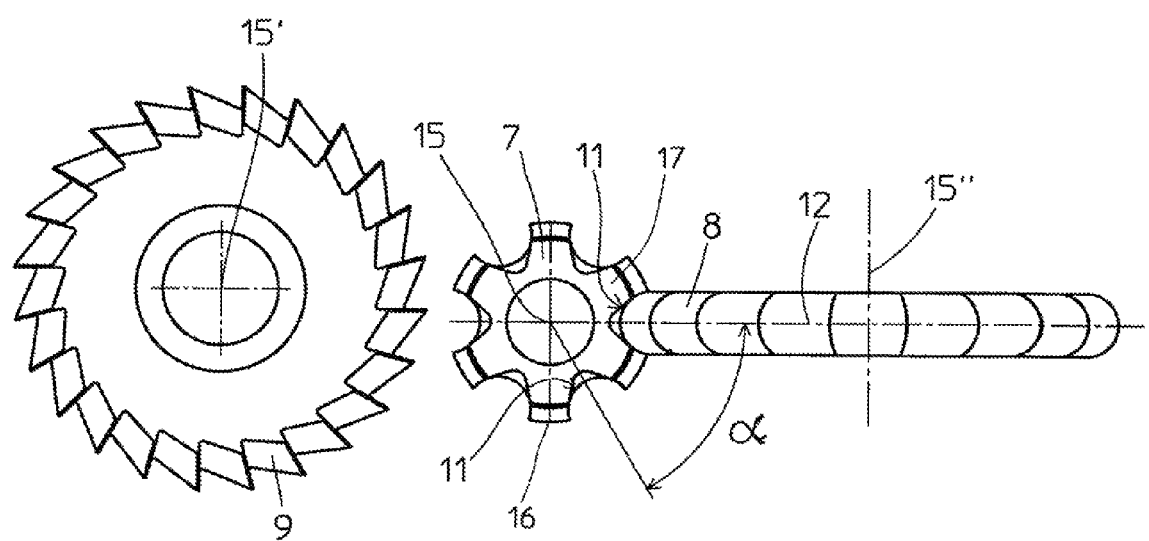
FIG. 2 is a schematic top view showing how the races of the race gear are finished.
Figure 3:
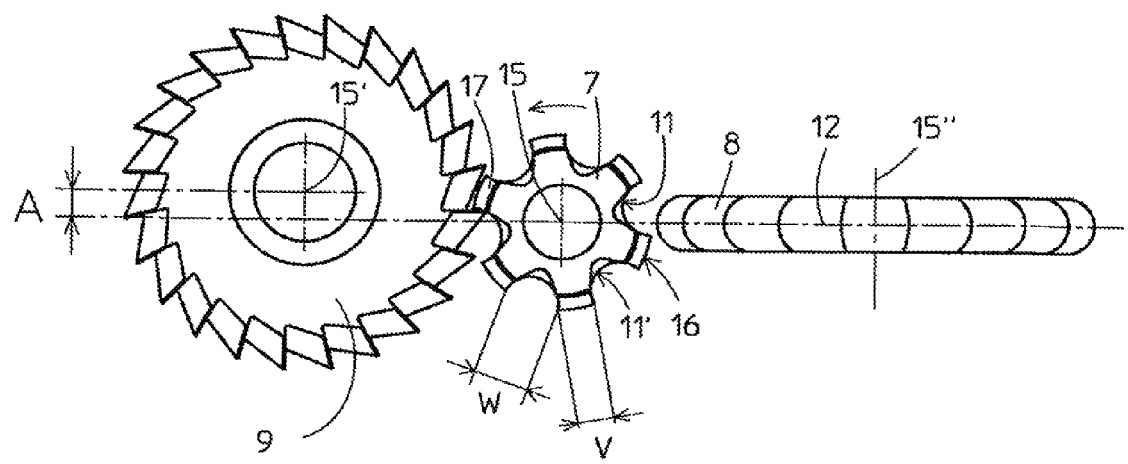
FIG. 3 is a top view illustrating how the lobe outer surfaces are finished.

The right-hand side of the frame 1 carries a support 13 on which a finishing tool 8, here a wheel-type miller, is mounted for rotation by a drive motor 20 about a fixed horizontal axis 15" perpendicular to the directions x and z as shown also in FIGS. 2 and 3. This axis 15' is fixed relative to the frame 1. The grooves 11 are finished by moving the workpiece gear 7 simultaneously in the directions x and z to move in an arc past the tool 8, this arc being concave toward the tool 8. The entire support 13 can be pivoted about an axis 12 perpendicular to the axis 15" and parallel to the direction x when the grooves 11 extend at an angle, that is not parallel to the bore through the gear 7, but during machining the axis 15" is fixed. The wheel 8 has teeth forming a rounded outwardly convex outer surface.

To the left of this, as seen in FIGS. 1, 2, and 3, there is another milling wheel 9 rotatable by a motor 14 about a fixed vertical axis 15' parallel to the direction z. This wheel 9 has an array of teeth forming a radially outwardly concave groove. The outer surfaces 16 are shaped by rotation of the gear 7 about the vertical axis 15 while engaging the tool 9. Thus the gear 7 must rotate about the axis 15 while the tool 9 rotates about its axis 15' so as to finish machine the surfaces 16.

The axis 15' is offset by a spacing A from a vertical plane running through the axis 15 and perpendicular to the axis 15" as shown in FIG. 3, so that when the workpiece gear 7 is moved from the tool 8 to the tool 9, the latter smoothly engages and machines the face 16.

In fact the gear 7 is jogged back and forth in the direction x, with one groove 11 being machined, then one of the surfaces 16, then the next groove 11, and so on. The offset A allows the two tools 8 to be so closely spaced that the workpiece 7 only has to move enough to disengage the tool 8 from the groove 11 it has just machined for machining of the next face 16, and the offset A ensures that, as shown in FIG. 3, when moved out like this at most only an edge of one of the faces 16 is engaged by the continuously rotating wheel 9. The machining of the face 16 takes place as the gear 7 is being moved from alignment of one of the grooves 11 with the tool 8 to alignment of the next groove 11 with the tool 8 so that the workpiece 7 is moved in the direction x from the position of FIG. 2 to the left once the groove 11 is machined, then rotated through the angle α, which machines the next face 16, then shifted back in direction x to the right to machine the next groove 11 and so on. To this end the offset A is equal for a gear 7 with an uneven number of lobes 17 to half an angular width W of a groove 11 and for a gear with an even number of lobes to half an angular width V of a lobe 17. Thus the six-groove workpiece is jogged back and forth six times to completely finish its grooves 11 and faces 16, using tools 8 and 9 rotating about stationary axes 15' and 15". With the spindle 6 moving in the directions x and z during machining of the grooves 11 but stationary during machining of the faces 16.

According to this method the complete lobe outer surface 16 can be finished during non-productive times, which inevitably occur during the finishing of the race grooves 11, 11'. This results in a significantly improved cycle time for the finishing of race gears.

Figure 4:
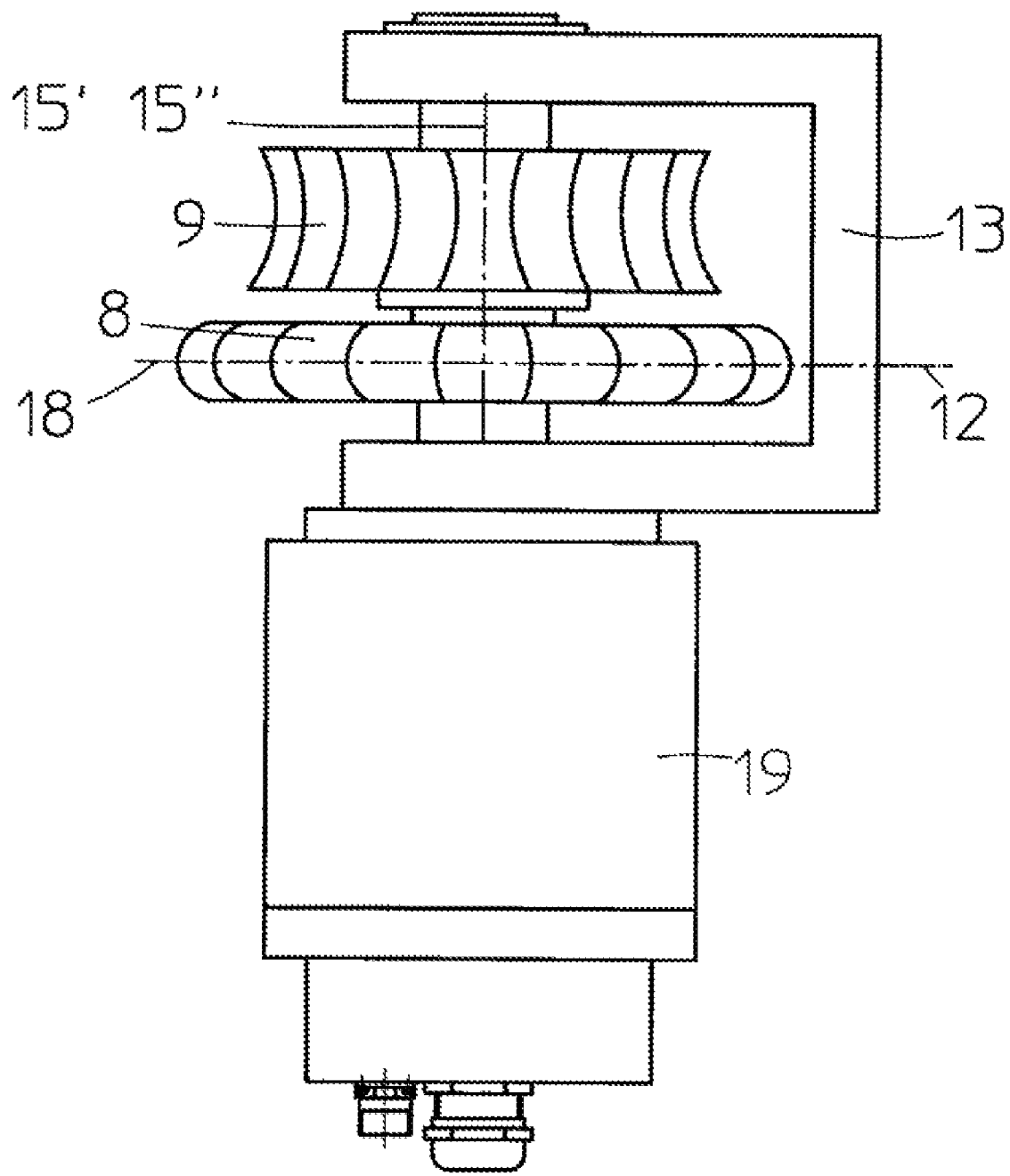
FIG. 4 is a side view of a two-tool machining subassembly.

FIG. 4 illustrates an advantageous embodiment, here the tools 8 and 9 are both carried a single motor drive 19. The motor spindle 19 is supported in the holder 13, and can be pivoted about the axis 12. In order to finish the race grooves 11 the axis 15" of the tool 8 is set orthogonal to the axis 15 of the race gear 7. As soon as the race groove 11 has been completed, the motor spindle 19 pivots through 90° about the axis 12. In this manner the axis 15' of the tool 9 is aligned parallel to the axis 15 of the race gear 7. Subsequently, angular stepping of the gear 7 to bring the next groove into alignment is carried out. The partial segment 17 is finished during this pivoting movement. In an advantageous embodiment the pivoting axis 12 of the tool lies on its symmetry plane 18. Furthermore, the axis 12 intersects and plane 18 includes the axis 15 of the race gear 7. Due to this arrangement, the race gear 7 can switch from tool 8 to tool 9 and vice versa along their axis 15 by means of a self-activated movement.

I claim:

1. A method of finishing race grooves and lobe outer surfaces of a constant-velocity race gear centered on a gear axis, the method comprising, the steps of sequentially:
   a) engaging a first groove of the race gear with a rotating groove-machining tool and relatively moving the race gear and rotating groove-machining tool arcuately to finish the first groove while holding the race gear against rotation about its gear axis;
   b) disengaging the first groove of the race gear from the rotating groove-machining tool while holding the race gear against rotation about its gear axis;
   c) rotating the race gear about its gear axis to align a second groove with the rotating groove-machining tool while engaging a first lobe outer surface with a rotating surface-machining tool to finish same; and
   d) repeating steps a) through c) to finish the second groove and a second lobe outer surface and so on until all the grooves and lobe outer surfaces of the race gear are finished.

2. The finishing method defined in claim 1 wherein the tools are both rotated about respective axes that are fixed.

3. The finishing method defined in claim 1 wherein in step b) the race gear is moved in a straight line into engagement with the surface-machining tool.

4. The finishing method defined in claim 1 wherein in step a) the race gear is moved in a straight line into engagement with the groove-machining tool.

5. The finishing method defined in claim 1 wherein both tools are rotated about a common axis, the method further comprising the step of:
   pivoting the tools about an axis about a pivot axis perpendicular to or parallel to their common axis.

6. The finishing method defined in claim 1, further comprising the step before step a) of picking up the gear from an adjacent station and the step after step d) of depositing the gear in the station.

7. An apparatus for finishing race grooves and lobe outer surfaces of a constant-velocity race gear centered on a gear axis, the apparatus comprising:
   a groove-machining tool;
   means for rotating the groove-machining tool about an axis;

a surface-machining tool;

means for rotating the surface-machining tool about an axis;

means holding the workpiece for a) engaging a first groove of the race gear with the rotating groove-machining tool and relatively moving the race gear and rotating groove-machining tool arcuately to finish the first groove while holding the race gear against rotation about its gear axis;

b) disengaging the first groove of the race gear from the rotating groove-machining tool while holding the race gear against rotation about its gear axis;

c) rotating the race gear about its gear axis to align a second groove with the rotating groove-machining tool while engaging a first lobe outer surface with the rotating surface-machining tool to finish same; and d) repeating steps a) through c) to finish the second groove and a second lobe outer surface and so on until all the grooves and lobe outer surfaces of the race gear are finished.

8. The finishing apparatus defined in claim 7 wherein the axis of the groove-machining tool is held stationary and substantially perpendicular to the gear axis and the axis of the surface-machining tool is held stationary and substantially parallel to the gear axis during finishing.

9. The finishing apparatus defined in claim 7 wherein the groove-machining tool is limitedly pivotal about a pivot axis perpendicular to the rotation axis of the groove-machining tool, the pivot axis, gear axis, and rotation axis of the surface-machining tool being substantially coplanar.

10. The finishing apparatus defined in claim 9 wherein the groove-finishing tool is a wheel symmetrical to a plane including the pivot axis.

11. The finishing apparatus defined in claim 7 wherein the axis of rotation of the surface-machining tool is offset by a predetermined distance from a plane including the gear axis and perpendicular to the rotation axis of the groove-machining tool.

12. The finishing apparatus defined in claim 11 wherein the distance is substantially equal to half an angular width of one of the grooves and to half an angular width of a lobe defined between a pair of grooves.

13. The finishing apparatus defined in claim 7 wherein both tools are rotatable about a common axis.

* * * * *